Figures 1, 2:
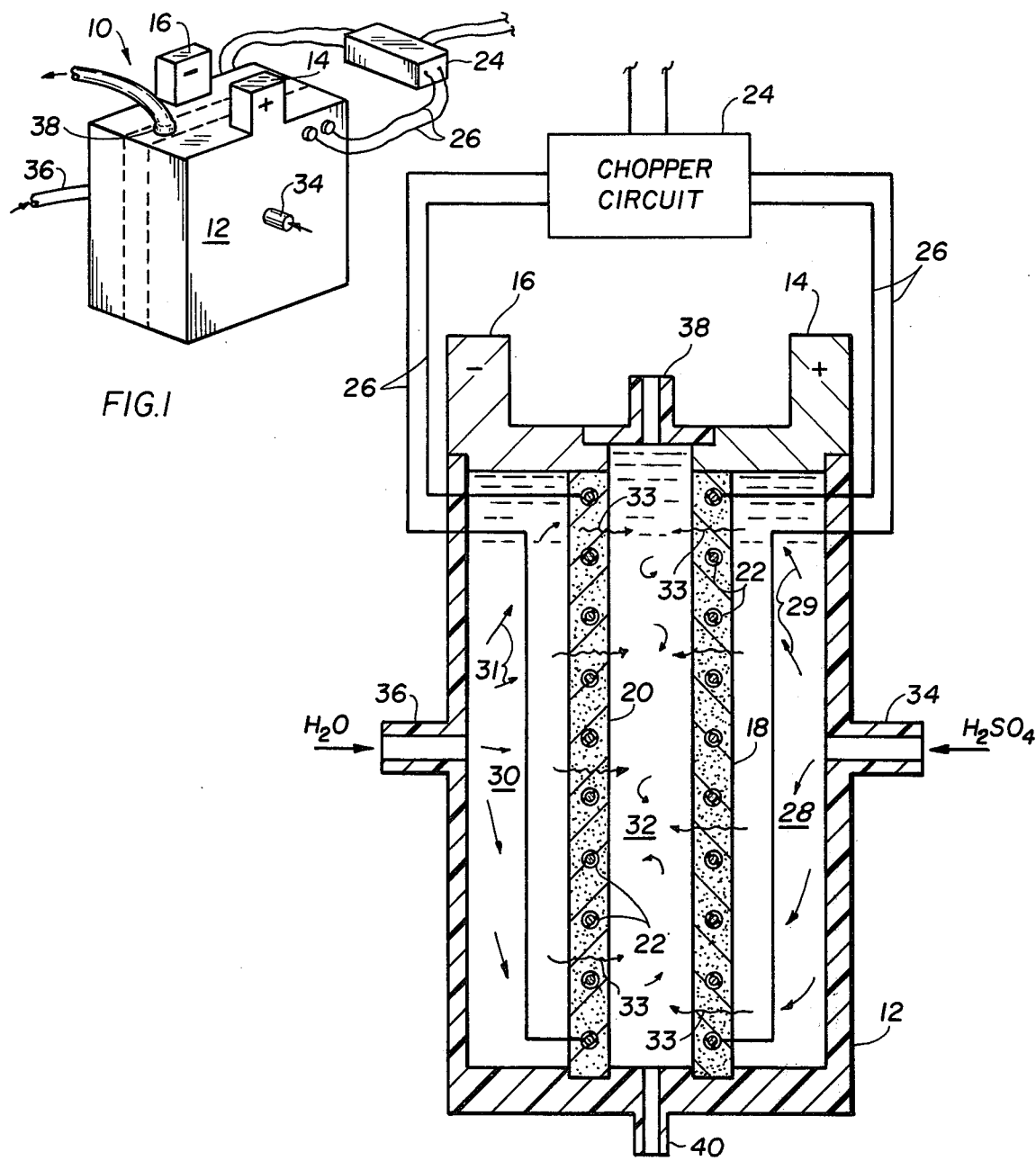

United States Patent [19]

Borello

[11] 4,042,754
[45] Aug. 16, 1977

[54] BATTERY

[76] Inventor: Domenic Borello, 142 Nyack Ave., Pelham, N.Y. 10803

[21] Appl. No.: 734,316

[22] Filed: Oct. 20, 1976

[51] Int. Cl.² .................. H01M 10/04; H01M 10/06
[52] U.S. Cl. ........................ 429/10; 429/70; 429/225; 429/228
[58] Field of Search ............ 429/10, 14, 51, 63, 429/70, 95, 110, 118, 225, 228

[56] References Cited

U.S. PATENT DOCUMENTS 3,493,436  2/1970  Johnsen .................... 429/10
3,647,543  3/1972  Biddick ................. 429/63 X
3,769,090  10/1973 Katz et al. ................. 429/14

*Primary Examiner*—Anthony Skapars
*Attorney, Agent, or Firm*—Bauer, Amer & King

[57] ABSTRACT

A battery in which, to improve its discharging performance, the liquid electrolyte is maintained at a specific gravity that is optimum for electrical conductivity, and a magnetic flux is imposed upon the battery plates, and other such conditions which also favor electrical conductivity, saturation, storage and desaturation are maintained.

4 Claims, 2 Drawing Figures

U.S. Patent    Aug. 16, 1977    4,042,754

BATTERY

The present invention relates generally to an improved battery using accepted and proven construction materials for the cell and battery plates and also accepted and proven chemicals for the electrolyte, but wherein noteworthy structural features are embodied in the cell plates, and wherein the electrolyte is more effectively handled, all to the end of correspondingly providing a significant improvement in the performance of the battery.

In contrast to the considerable research effort to devise new metals for the cell plates of batteries, as well as new and different chemicals for the electrolytes, an object of the present invention is to more effectively and efficiently use what is available to provide significant increases in the efficiency of a battery.

Underlying the present invention is the recognition that a battery structure, such as a common automotive lead cell, initially, as input, receives, divides and stores electrical components, and then subsequently functions by reconstituting these components to their original electrical input state. Therefore, a battery structure can be considered to be a first stage generator with regard to said input, and its subsequent performance during its second stage, when it is transmitting electricity, is necessarily related, and in fact limited, to its said initial performance as a generator. Stated somewhat another way, if the battery structure inefficiently receives, divides and/or stores the electrical components involved, it will correspondingly function inefficiently as an electricity-transmitting device or, so-called battery. Conversely, if it functions efficiently as a generator in the manner in which it accepts the electrical components, it is therefore inherently capable of functioning more efficiently and effectively as a battery.

It is an object of the present invention to induce, by novel construction of the battery cell plates, a condition wherein the components of electricity saturate more directly and uniformly into and within said cell plates, and wherein the stored current is more efficiently released therefrom upon demand of the external load. By virtue of the improvements in these two respects, the output performance of each battery plate of this invention has been found in practice to be equal to that of twelve conventionally constructed plates of the prior art.

It is a further object to provide the battery plates herein with electrolyte in a manner and form which promotes the saturation of these plates during charging, and which also promotes a complete desaturation, i.e. release without residual losses, during the discharging phase. The within battery, while thus requiring only materials and a use of same that have already been proven to produce storing and discharging of electricity, nevertheless is characterized by a noteworthy, and heretofore unattainable, efficiency by virtue of the manner in which these materials are specifically constructed and are specifically used, said specific construction and use heretofore not having been applied to, or directly embodied in, a battery structure. That is, as already noted, the invention is not concerned with any new construction material for the cell plate, or with new chemicals for the electrolyte, although this is a possibility, and would, of course, correspondingly result in even higher rates of charge, discharge and current density.

Further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a perspective view of a battery structure demonstrating objects and advantages of the present invention; and FIG. 2 is a side elevational view, in longitudinal cross-section, and on an enlarged scale, showing internal structural features of the battery structure.

As shown in the drawings, the device or proposed battery structure 10 hereof has a plastic housing 12 and positive and negative terminals 14 and 16, respectively. Within the housing 12 are mounted porous electrodes 18 and 20. Both electrodes are made of the usual lead battery material, but will be understood to have openings therein or a porosity which will not prevent the passage of fluids under pressure through the electrodes. More particularly, positive electrode 18 is a porous lead peroxide, and negative electrode 20 is a sponge or porous lead. Assembled within the electodes 18 and 20 is an insulated titanium wire 22 which is electrically connected to be energized by a chopper circuit 24 through a conductor 26 so as to alternately supply and induce current into one plate at a time, at a frequency between 60 and 300 cycles per second, during charging and discharging of the battery.

It has been found that the induced magnetic flux field of the circuit 24 adds to the magnetic flux transmission and storage properties of the electrode sites 18, 20, during charging, and thus promotes greater saturation thereof during this phase. This is analogous to what occurs in the operation of a generator when two magnetic flux fields cross each other, except that in the battery hereof the magnetic flux field settles upon the plates or electrode sites 18, 20, to thus provide what can be called a first phase generator. The full generator cycle is then completed when current is discharged from the electrode sites 18, 20. In this connection, it has been further found that said same induced magnetic flux field has the unobvious effect during the discharging phase of driving, probably by magnetic flux repulsion, the electrical components from the electrodes 18, 20 during the discharging phase, or when the battery 10 is transmitting electricity.

The outer housing 12 and electrode plates 18 and 20 define three fluid chambers 28, 30 and 32. On the right side of FIG. 2, chamber 28 is supplied with sulphuric acid, designated 29, via inlet 34, said acid being either in solution or concentrated, and preferably being supplied at a temperature of $-20°$ F. The acid 29 is under a slight pressure and is allowed to ooze through the porous structure of electrode 18 into the center chamber or mixing compartment 32.

On the left of FIG. 2 is water chamber 30 supplied through inlet 36. Said water 31, more particularly, is maintained under 1 to 2 pounds pressure of pure oxygen, which is effective both to make the water oxygen-rich and also to force the water through the porous structure of the electrode 20. The water is preferably introduced at a temperature of 150° F.

From the description already provided, it should be readily appreciated that center compartment 32 acts as a mixing chamber for the continuously renewed electrolyte composed of the above noted oxygen-rich water 31 and sulphuric acid 29. Flow of the water and acid is controlled to provide an ideal specific gravity of the mix, which is approximately 1.275, which specific gravity is known to be most favorable for electrical conductivity.

To continuously monitor or supervise the specific gravity of the electrolyte mix in compartment 32 use may be made of any of the numerous models of battery hydrometers available for this purpose. Further, to maintain an optimum specific gravity of 1.275 may require appropriately either increasing or decreasing the flow of water 31 into the compartment, which is readily accomplished by correspondingly modifying the flow-producing oxygen pressure.

AT the top of compartment 32 is overflow outlet 38 by which any excess electrolyte is conducted to a reservoir for processing and recycling. When not in use, the electrolyte mix 29, 31 in compartment 32 can be drained through the bottom port 40.

By virtue of maintaining the electrolyte 29, 31 at the optimum or ideal specific gravity of 1.275, it more effectively promotes electron flow between the electrodes 18 and 20 during both the charging and discharging phases, thereby correspondingly increasing the efficiency of the battery.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An improved battery comprising an outer housing bounding an internal battery compartment, and a cooperating negative and positive pair of battery plates disposed in spaced apart relation in said battery compartment so as to subdivide same into a central electrolyte mixing compartment and separate first and second electrolyte inlet compartments on opposite sides thereof, each said negative and positive battery plate being comprised of a porous construction material for permitting the continuous flow of electrolyte components from said inlet compartments into said mixing compartment in accordance with a selected specific gravity of the electrolyte mixture in said central compartment optimum for electrical conductivity, whereby the maintaining of said elecrolyte mixture at said selected optimum specific gravity promotes effective charging and discharging of said battery plates.

2. An improved battery as claimed in claim 1 including a magnetic flux-producing electrical circuit embodied in said battery plates, and means effective to periodically energize said circuit for producing a magnetic flux field, whereby said magnetic flux field supplements the capacity of said battery plate sites to receive, divide and store electrical components, and thereafter reunite same to the end of discharging electricity.

3. An improved battery as claimed in claim 2 wherein said negative battery plate is lead, said positive battery plate is lead peroxide, and said magnetic flux-producing circuit is achieved using an insulated wire constructed of titanium.

4. An improved battery as claimed in claim 3 wherein one electrolyte component is water, and said water is forced by oxygen under pressure into said first electrolyte compartment, whereby said water subsequently flows into said mixing compartment in an oxygen-rich condition which further promotes effective electrical conductivity of the electrolyte mixture.

* * * * *